(12) United States Patent
Hodjat et al.

(10) Patent No.: US 7,598,308 B2
(45) Date of Patent: Oct. 6, 2009

(54) METAL—ELASTOMER COMPOUND

(75) Inventors: Yahya Hodjat, Oxford, MI (US); Yuding Feng, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 11/094,009

(22) Filed: Mar. 30, 2005

(65) Prior Publication Data

US 2006/0223927 A1     Oct. 5, 2006

(51) Int. Cl.
*C08K 3/38* (2006.01)

(52) U.S. Cl. .................. 524/405; 524/502; 524/439

(58) Field of Classification Search .......... 524/405, 524/502, 439
See application file for complete search history.

(56) References Cited

U.S. PATENT DOCUMENTS

| | | | | |
|---|---|---|---|---|
| 4,499,228 A * | 2/1985 | Ogawa et al. | ............... | 524/413 |
| 4,566,990 A | 1/1986 | Liu et al. | ............... | 252/503 |
| 6,268,408 B1 * | 7/2001 | Dispenza | ............... | 523/222 |
| 6,573,322 B1 * | 6/2003 | Sakakibara et al. | ......... | 524/434 |
| 6,715,511 B2 | 4/2004 | Yamamoto et al. | ......... | 138/141 |
| 6,824,730 B2 * | 11/2004 | Mashita et al. | ............... | 264/480 |
| 6,936,191 B2 * | 8/2005 | Fox et al. | ................. | 252/512 |

FOREIGN PATENT DOCUMENTS

| | | |
|---|---|---|
| EP | 1 500 677 A2 | 1/2005 |
| JP | 60208467 A2 | 10/1985 |
| JP | 61287962 A2 | 12/1986 |
| JP | 63230747 A2 | 3/1987 |
| JP | 62-101654 | 12/1987 |
| JP | 01284553 A2 | 11/1989 |
| JP | 09031244 A2 | 2/1997 |
| JP | 10060206 A2 | 3/1998 |
| JP | 2003082168 A2 | 3/2003 |
| WO | WO 2004/083292 A1 | 9/2004 |

* cited by examiner

*Primary Examiner*—Robert D. Harlan
(74) *Attorney, Agent, or Firm*—J. A. Thurnau, Esq.; J. L. Mahurin, Esq.; P. N. Dunlap, Esq.

(57) ABSTRACT

A metal elastomer compound comprising an elastomer having a molecular weight in the range of approximately 100,000 g/mol up to approximately 300,000 g/mol, a metal fiber material comprising a plurality of metal fibers each having an aspect ratio greater than approximately 1, and the metal fiber material mixed with the elastomer in an amount in the range of 50 phr up to 100 phr.

11 Claims, 6 Drawing Sheets

METAL—ELASTOMER COMPOUND

FIELD OF THE INVENTION

The invention relates to a metal elastomer compound, namely, a compound comprising fibrous metal material mixed with an elastomer in the range of approximately 50 phr to 150 phr.

BACKGROUND OF THE INVENTION

Elastomers by nature are flexible materials which are used in many applications such as belts, hoses, tires, etc. Metals on the other hands have much less flexibility, but have a much higher tensile and shear strength. Although metals have been added to elastomers in a limited amount to improve electrical conductivity, the purpose for which elastomers and metals have been combined, the percentage of added metals, and the benefits have been very limited.

Another example of metals combined elastomers is steel belted tires wherein steel wires of differing shapes are embedded in an elastomer body to improve properties. In the case of tires, the steel wires are relatively thick inserts that are not incorporated into the elastomer material mix. They are distinct cords which are not incorporated into the elastomer.

On the other hand, a composite material is a combination of two or more materials that has characteristics not shown by either of the materials separately. It has long been recognized that two or more materials may be blended together to form a wide variety of structured morphologies to obtain products that potentially offer desirable combinations of characteristics. For example, fiberglass is made from fine glass fibers bonded in most cases by polyester resin. The glass fibers are very strong in tension, and the resin helps to define the shape, bonds well to the fibers, and prevents the fibers from damaging each other by rubbing against adjacent fibers. Currently, many different types of fibers are available. Of course, fiberglass is not known for being particularly conductive.

Representative of the art is Japanese application no. JP 1995000207596 which discloses a dielectric elastomer composition obtained by blending a fibrous material of a metallic salt of titanic acid compounded with an elastomer.

What is needed is a compound comprising an elastomer combined with metal fibers or powders with a sufficiently high metal content to give the compound sufficient strength, heat transfer capabilities, magnetic properties and conductivity while retaining the flexibility of elastomers. The present invention meets this need.

SUMMARY OF THE INVENTION

The primary aspect of the invention is to provide a compound comprising an elastomer combined with metal fibers or powders with a sufficiently high metal content to give the compound sufficient strength, heat transfer capabilities, magnetic properties and conductivity while retaining the flexibility of elastomers.

Other aspects of the invention will be pointed out or made obvious by the following description of the invention and the accompanying drawings.

The invention comprises a metal elastomer compound comprising an elastomer having a molecular weight in the range of approximately 100,000 g/mol up to approximately 300,000 g/mol, a metal fiber material comprising a plurality of metal fibers each having an aspect ratio greater than approximately 1, and the metal fiber material mixed with the elastomer in an amount in the range of 50 phr up to 150 phr.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
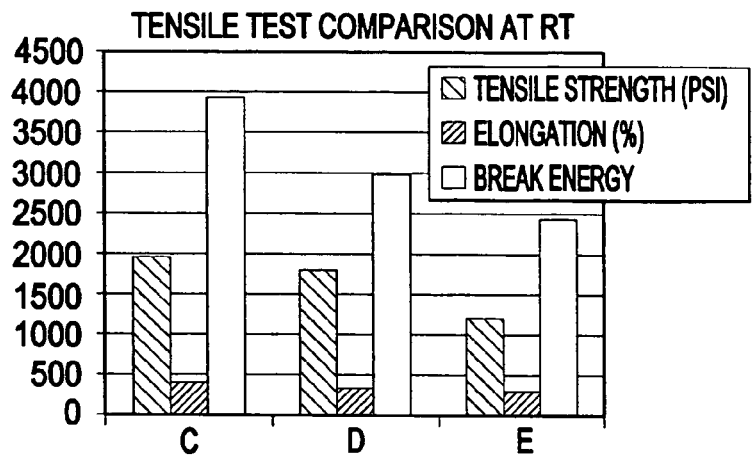
FIG. 1 shows the compound tensile property at extension break (elongation around or above 300%).

The invention comprises a composite compound having a mixture of an elastomer and a fibrous metal material. A relatively high metal content gives the compound certain desirable attributes of metals including strength, heat transfer capabilities, magnetic properties and conductivity of metals while exhibiting the flexibility of elastomers. The form of the metal fibers or powder added to the elastomer can be of any physical shape. The preferred physical shape consists of discrete fibers each having an aspect ratio (Length:Width) in excess of approximately 1:1 up to approximately 6000:1. Once mixed the compound is cured by heat and pressure using methods known in the art. The cured compound can be used in a number of products. The specification is based upon the cured compound and to which the test results apply.

In the preferred embodiment an elastomer is mixed solely with metal fibers. In an alternate embodiment the elastomer can be mixed with a combination of metal fiber and metal powder. In the alternate embodiment the ratio of metal powder to metal fiber by weight can be in the range from approximately zero, i.e, no powder, to approximately one, i.e, substantially the same amount of metal powder and metal fiber by weight. The metal powder particles have an aspect ratio in the range of approximately 1.

One of the preferred metal materials used for the fiber or powder is stainless steel due to its high tensile strength and corrosion resistance. Another suitable metal is aluminum alloy due to its low weight, high strength and corrosion resistance. In addition to stainless steel and aluminum, other fiber materials may be used such as glass fibers and carbon fibers as well as other metals described herein.

To manufacture the compound, metal fiber (and metal powder for the alternate embodiment) is mixed with the elastomer components using mixing methods known in the art. The strands of metal fiber or metal powder particles are randomly distributed throughout the elastomer compound during the mixing process with no preferred axial orientation. By interlocking, crossing and spreading throughout the matrix of the cured compound the metal fibers improve the mechanical properties of the compound such as tensile strength, compressive strength, and fatigue strength over that of the elastomer by itself. Furthermore, when used for products for which wear occurs on the surface of the part (such as tires and belts), after some minimal initial wear of the surface of the compound the exposed metal fibers and metal powders create a very good wear resistance.

In yet another alternate embodiment, the metal fibers can be axially oriented by a calendaring step known in the art so that the major axis of a substantial number of the metal fibers are substantially parallel to a machine direction. This will cause the compound to have a dual flexibility dependent upon the direction of orientation of the fibers. Namely, the compound will be more flexible in a direction transverse to the machine direction, that is, more flexible along an axis that is normal to the predominant direction of the axis of the parallel fibers.

The metal fiber length and cross sectional dimensions are unlimited so long as the size and shape of the metal fibers don't adversely affect performance of the compound. However, the preferred size range is approximately 5 to 30 mm long and 0.005 to 0.5 mm (5 to 500 micron) in diameter. For purposes of illustration only the fiber cross section is considered round, but the cross section may be of any shape. The percentage of metal fiber in the elastomer can be any amount required but approximately 20% to about 80% percent by volume is the preferred range. Since the metal fibers are only 5 to 30 mm in length with a small cross sectional diameter, they allow the compound to flex like an elastomer, while also exhibiting metal-like properties where desired. Hence, the inventive compound has the characteristics of both a metal and an elastomer.

Furthermore, the inventive compound and its method of manufacture can be applied to all types of plastics, including thermoset and thermoplastic materials. It can be used in any product where it is desirable to achieve increased mechanical strength, improved wear resistance, enhanced heat transfer, as well as improved electrical conductivity over the prior art due to the higher metal fiber content. The type of metal used, the size and shape of the fibers, and the percentage of the added metal fiber compared to the elastomer amount can be adjusted to suit a particular application.

Elastomer-Metal Base Line Compatibility

Following are example recipes for the inventive compound. Table 1 lists the compound recipe used in this analysis. "X" denotes the phr value of metal fibers in the compound. Table 2 illustrates the compound mixing procedures.

TABLE 1

Compound Recipe

| Ingredients | Control | Phr |
|---|---|---|
| EPDM | 100 | 100 |
| Carbon Black | 150 | phr = [150 − X] |
| Metal fibres | 0.0 | X |

TABLE 1-continued

Compound Recipe

| Ingredients | Control | Phr |
|---|---|---|
| ZnO | 5.00 | 5.00 |
| Zinc Stearate | 1.50 | 1.50 |
| Antioxidant | 1.50 | 1.50 |
| Oil | 50 | 50 |
| Other ingredients | 10 | 10 |
| Curatives | 7 | 7 |

TABLE 2

Mixing procedure.

| | | |
|---|---|---|
| Master Batch Mixing | 0' | 50 rpm $1^{st}$ pass |
| | 1' | Add fillers (black and/or metal fiber), oil, ram down. Add other chemicals, ram down. Add polymer. Lift ram, Scrape, and lower ram. Dump when temperature approach at 300 F. or 4 minutes |
| Final Mixing | 0' | 20 rpm final |
| | 2' | Add ½ MB, then curatives, then ½ MB. ram down. Lift ram, scrape, and lower ram. Dump when temperature reaches at 220 F. for 3 minutes. |

0' means the beginning or start of mixing; 1' means 1 minute from the start of mixing; 2' means 2 minutes from the start of mixing. "MB" means "master batch", which is the compound without curatives. "Phr" refers to pounds per hundred rubber, a convention known in the elastomer arts.

Table 4 shows the compound recipe used to evaluate the initial mixing performance of the inventive compound. Compound (A) is a control compound without metal fiber. Mixing was performed according to the procedure shown in Table 3. Four different types of stainless steel fibers were investigated (see Table 3) sold by NV Bekaert SA with headquarters located in Belgium. Beki-Shield GR was coated by polyester resin for improving bonding (or cooperation) with polymer (plastics or rubber) matrix. Beki-Shield BU is the same metal fibre as "GR" version, just without coating and in bundle form. Bekipor® WB is a composition of metal fibers, uniformly laid to form a three-dimensional non-woven structure. Its porous medium is a non-woven, highly porous fiber matrix made of sintered metal fibers. A stainless steel fiber having a large diameter from Fibre Technology Ltd was evaluated as well, namely MO446/10.

Other suitable metal fiber metals may also include any type of stainless steel, any type of steel having a carbon content of up to 1.0% including, low carbon steel, high carbon steel, and alloy steels. Aluminum and aluminum alloys, "red" metals such as copper, brass and bronze. Nickel, chromium, zinc, tin, magnesium, vanadium and titanium. Inconel and other alloys. Any other metal and metal alloy fiber that is compatible with the chosen elastomer. The metal materials used for the metal fibers can be used for the metal powder as well.

Table 3 shows the material forms from Bekaert and Fiber Technology Ltd.

TABLE 3

Stainless steel fibers investigated.

| Trade Name | Manufacturer | Diameter (μm) | Coating |
|---|---|---|---|
| SR03204/MO446-10 | Fibre Technology Ltd | 50 | No |
| Beki-Shield GR | Bekaert | 8 | Polyester Coated |
| Beki-Shield BU | Bekaert | 8 | No |
| Bekipor WB | Bekaert | 8 | No |

The metal fiber used in Table 4 comprises BEKI-Shield GR™ which is a stainless steel material.

EPDM elastomer is used by example in this specification. However, the elastomer may also comprise ethylene-alpha-olefin elastomer; ethylene/acrylic elastomer; polychloroprene rubber; acrylonitrile butadiene rubber; hydrogenated acrylonitrile butadiene rubber; styrene-butadiene rubber; alkylated chlorosulfonated polyethylene; epichlorohydrin; polybutadiene rubber; natural rubber; chlorinated polyethylene; brominated polymethylstyrene-butene copolymers; styrene-butadiene-styrene-block copolymer; styrene-ethylene-butadiene-styrene block copolymer; acrylic rubber; ethylene vinyl acetate elastomer; silicone rubber, and a combination of any of at least two of the foregoing.

TABLE 4

Compound recipe to evaluate mixing performance.

| Ingredients | A | B |
|---|---|---|
| EPDM | 100 | 100 |
| Carbon Black | 127 | 27 |
| BEKI-Shield GR | \ | 100 |
| Stearic Acid | 1.45 | 1.45 |
| Polyethylene Glycol | 1.45 | 1.45 |
| Zinc Oxide | 6.88 | 6.88 |
| Calcium Oxide | 2.7 | 2.7 |
| Oil | 59 | 59 |
| Curative | 4.50 | 4.50 |

Compound (A) was mixed without any problems and dropped to 300 F in 4 minutes. Table 5 shows a comparison of physical properties. Compound (B) showed less desirable properties than compound (A).

TABLE 5

Physical property comparison.

| Property | A | B |
|---|---|---|
| Tensile strength (psi) | 2497.68 | 1240.77 |
| Elongation (%) | 261.00 | 667.13 |
| Mod. 25% (psi) | 162.51 | 159.67 |
| Mod. 50% (psi) | 296.76 | 186.53 |
| Mod. 100% (psi) | 810.45 | 228.90 |
| Mod. 200% (psi) | 2018.15 | 339.43 |
| Tear strength (lb/in) | 174.12 | 123.02 |
| Cset (22 hrs @ 70 C.) | 11.50 | 22.50 |
| Wear weight loss (Falex testing) (%) | 6.77 | 15.00 |

All the above observations indicate that the compatibility between rubber and metal fiber is very poor, which caused poor mixing behavior and poor compound physical properties.

Metal Elastomer Compatibility Improvement.

In order to improve the compatibility between the elastomer and the metal fibers zinc dimethylacrylate (ZDMA) (Sartomer Company, Inc.: Tradename "Saret 634") was used. ZDMA is a well known rubber-metal bonding agent. It was used in this compound to improve the compatibility between the elastomer matrix and metal fibers. Other bonding agents may be used in the inventive compound as well, including maleic anhydride grafted polyolefins, acrylic acid grafted polyolefins, zinc diacrylate, cobalt carboxylate, zirconate salt and titanate salt. Table 6 shows the recipes used for each compound C, D, E in this example. Only compound (E) contains metal fibers, namely, BEKI-Shield GR.

TABLE 6

Addition of bonding agent.

| Ingredients | C | D | E |
|---|---|---|---|
| EPDM | 100 | 100 | 100 |
| Carbon Black | 147 | 147 | 97 |
| BEKI-Shield GR | 0 | 0 | 50 |
| Zinc Oxide | 5.00 | 5.00 | 5.00 |
| Stearic acid | 1.50 | 1.50 | 1.50 |
| Polyethylene Glycol | 1.45 | 1.45 | 1.45 |
| Calcium Oxide | 2.00 | 2.00 | 2.00 |
| Oil | 80 | 80 | 80 |
| Saret 634 | 0 | 20 | 20 |
| Curatives | 6.40 | 6.40 | 6.40 |

Polyethylene glycol is used as a processing aid in the compound. Calcium oxide (80% weight content) is a desiccant which used to prevent porosity in the compound due to moisture.

Figure 2:
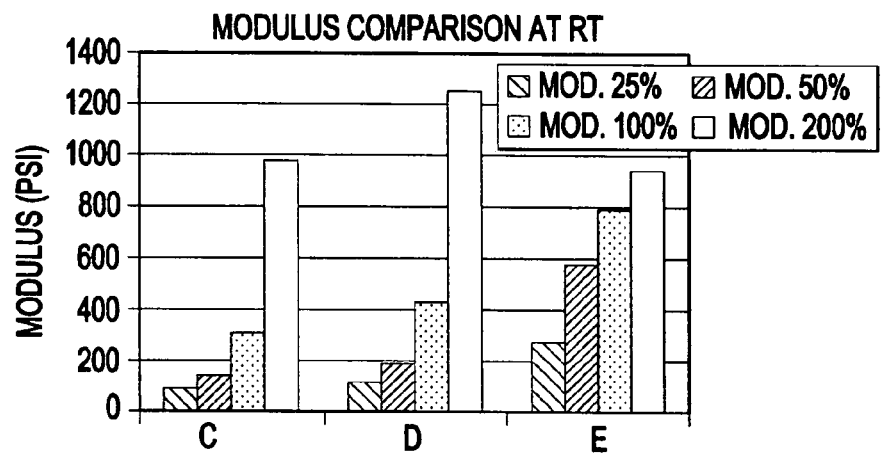
FIG. 2 shows compound extension modulus at 25%, 50% and 100% elongation having a significant increase by using metal fiber.

The compounds were mixed following the procedure in Table 3. All three compounds mixed very well and came together very well. FIG. 1 shows the compound tensile property at extension break (elongation around or above 300%). "RT" in this and other figures stands for room temperature, approximately 22° C. The use of metal fiber in the compound did not give significant improvement at extension break. However, compound extension modulus at 25%, 50% and 100% elongation (FIG. 2) obtained a significant increase by using metal fiber (BEKI-Shield GR).

Figure 3:
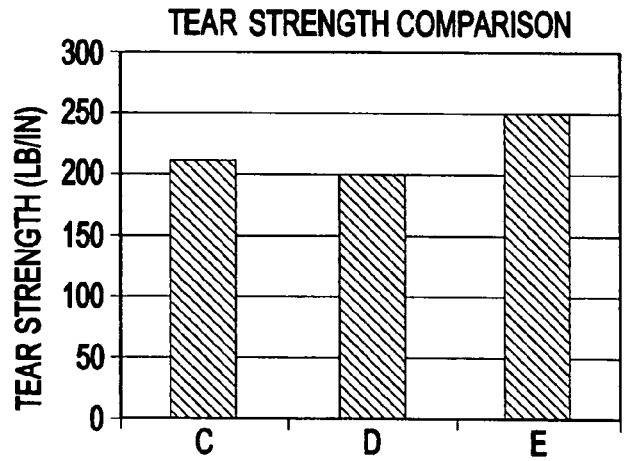
FIG. 3 shows a comparison based on compound tear strength.
Figure 4:
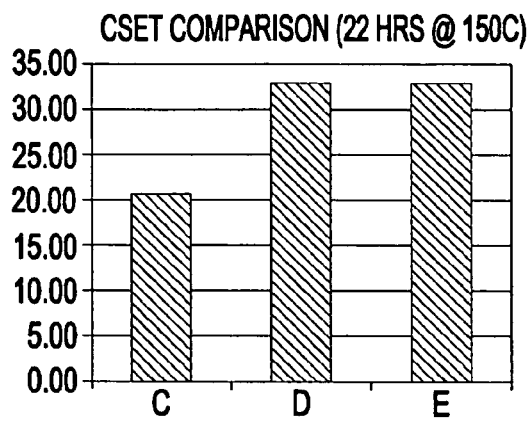
FIG. 4 is a comparison of the compound compression set as compared with the compound with bonding agent.

FIG. 3 shows a comparison based on compound tear strength. It can be seen that tear strength increased by use of metal fiber BEKI-Shield GR. However, compound compression set was not adversely affected as compared with the compound with bonding agent, see FIG. 4. Elastomer compression set is a measurement of the ratio of elastic to viscous components of an elastomer's response to a given deformation. Longer polymer chains tend to give better "set resistance" because of the improved ability to store energy (elasticity). Most elastomer compression set measurement standards call for a 25% original compression for a given time and temperature. The cross-section is measured after the load is removed. Elastomer compression set is the percentage of the original compression that is not recovered. Compression set may be conducted on cylindrical disks or O-rings. After a load is released from an elastomer, the difference between the final dimensions and the original dimensions is considered the "compression set".

Figure 5:
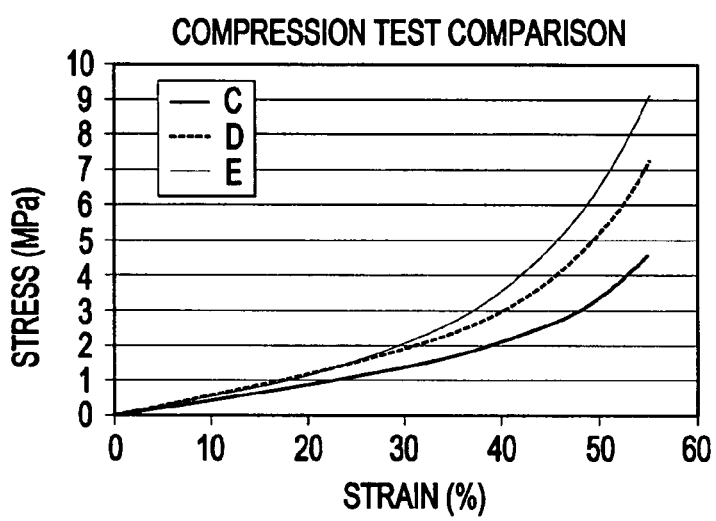
FIG. 5 shows stress-strain curves comparing compressive strength tests.

FIG. 5 shows stress-strain curves comparing compressive strength tests. It can be seen that compressive strength was improved by use of BEKI-Shield GR, especially at a high strain level.

Figure 6:
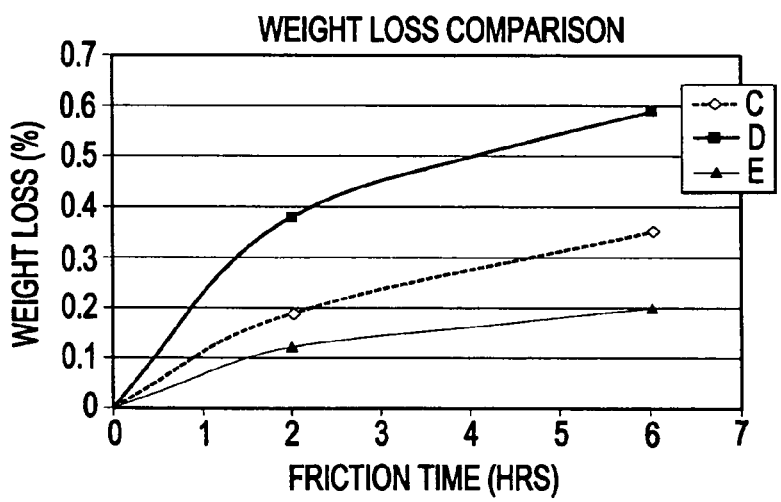
FIG. 6 compares the weight loss for the three compounds.

The wear property of each compound was tested at a friction speed of 200 rpm with a loading of 20 lbs. FIG. 6 compares the weight loss for the each compound. It can be seen that compound with bonding agent (D) has the highest weight loss. The inventive compound with the combination of metal fiber and bonding agent (E) showed the lowest weight loss.

Figure 7:
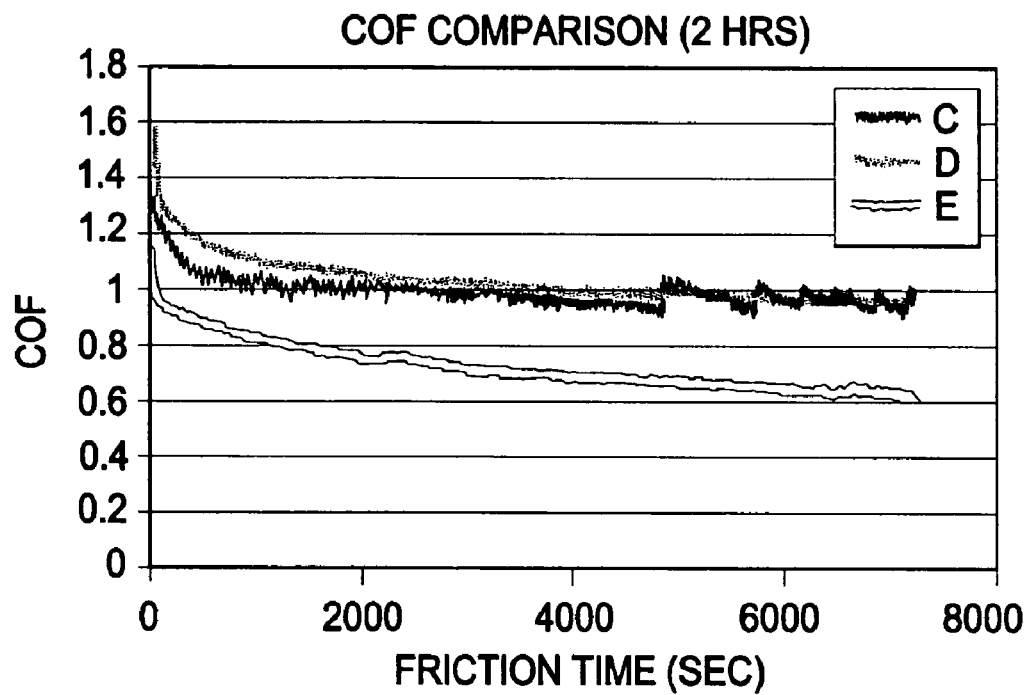
FIG. 7 shows a comparison of the coefficient of friction (COF).
Figure 8:
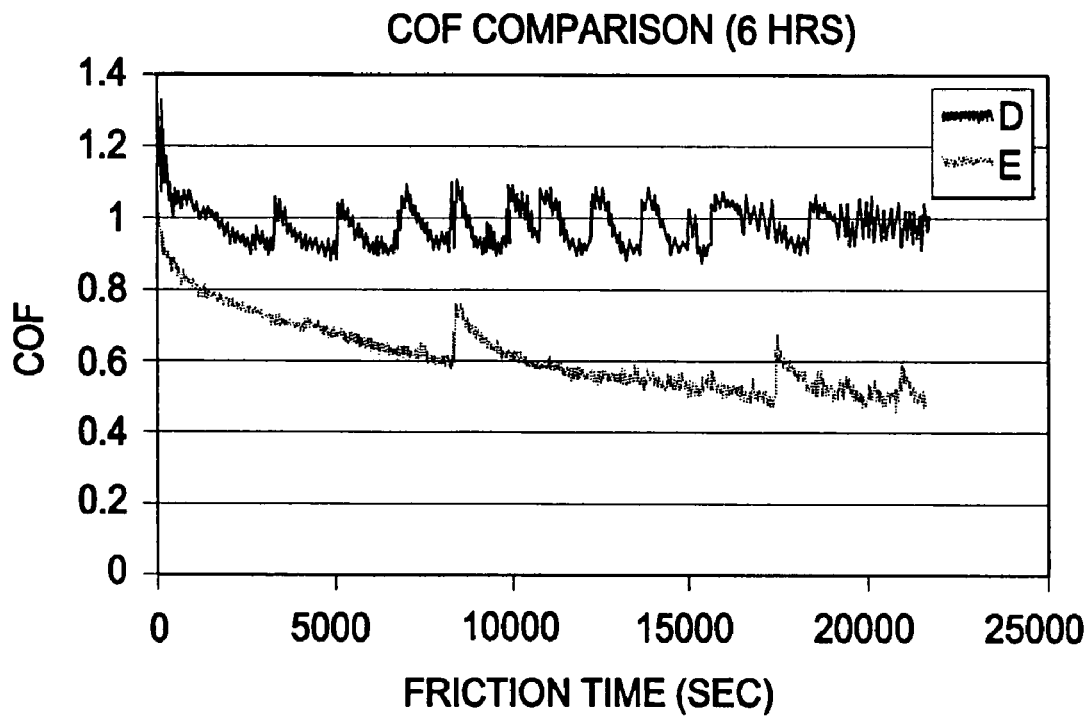
FIG. 8 shows test results for a test direction of 6 hours.

FIG. 7 shows a comparison of the coefficient of friction (COF). It can be seen that compound (E) has the lowest COF value, which is consistent with the lowest weight loss. Compound (D) has the highest COF, which could result in the highest weight loss for a test period of 2000 second. FIG. 8 shows test results for a test duration of 6 hours. The same trend was observed in FIG. 8 as in FIG. 7.

Based on the foregoing results the amount of metal fibers (BEKI-Shield GR) was increased to 100 phr in compound (F), see Table 7.

TABLE 7

Amount of metal fibers.

| Ingredients | C | D | E | F |
|---|---|---|---|---|
| EPDM | 100 | 100 | 100 | 100 |
| Carbon Black | 147 | 147 | 97 | 47 |
| BEKI-Shield GR | 0 | 0 | 50 | 100 |
| ZnO | 5.00 | 5.00 | 5.00 | 5.00 |
| Stearic acid | 1.50 | 1.50 | 1.50 | 1.50 |
| PEG | 1.45 | 1.45 | 1.45 | 1.45 |
| CaO-80 | 2.00 | 2.00 | 2.00 | 2.00 |
| Sunpar 2800 | 80 | 80 | 80 | 80 |
| Saret 634 | 0 | 20 | 20 | 20 |
| Curatives | 6.40 | 6.40 | 6.40 | 6.40 |

Figure 9:
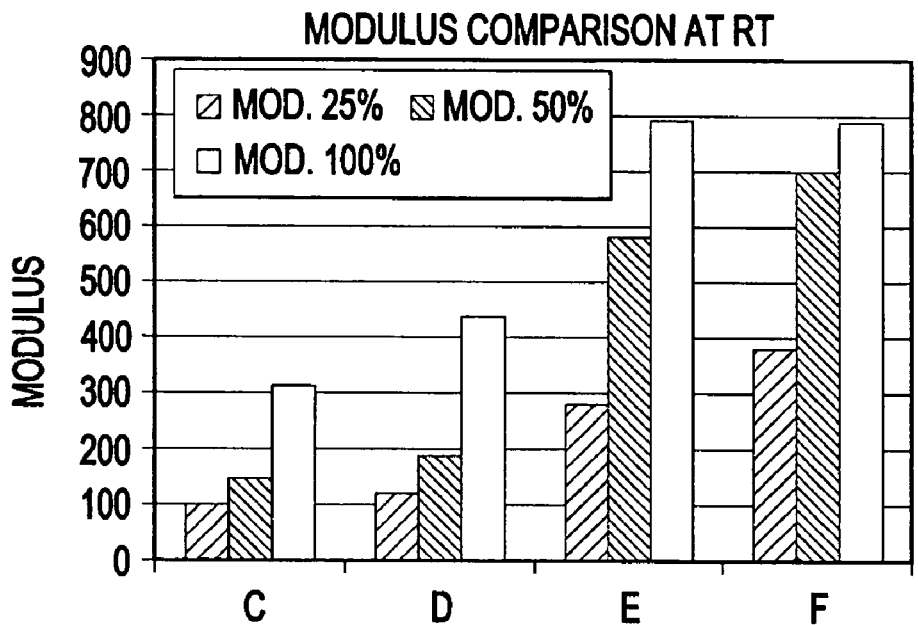
FIG. 9 shows a comparison of extension modulus.

FIG. 9 shows a comparison of extension modulus. It can be seen that the extension modulus at 25% and 50% elongation are increased with increasing metal fiber loading level. However, the modulus at 100% elongation does not change significantly with the metal fiber loading increase. Generally, the higher the elastomer molecular weight, the higher loading of fillers, including metal fibers, that can be put into the compound. In other words, the amount of metal fiber that can be loaded to the compound is dependent upon the elastomer molecular weight. For example, when using EPDM having a molecular weight in the range of approximately 100,000 g/mol to approximately 300,000 g/mol the metal fiber loading can range from approximately 50 phr up to approximately 150 phr while maintaining the desired physical properties.

Figure 10:
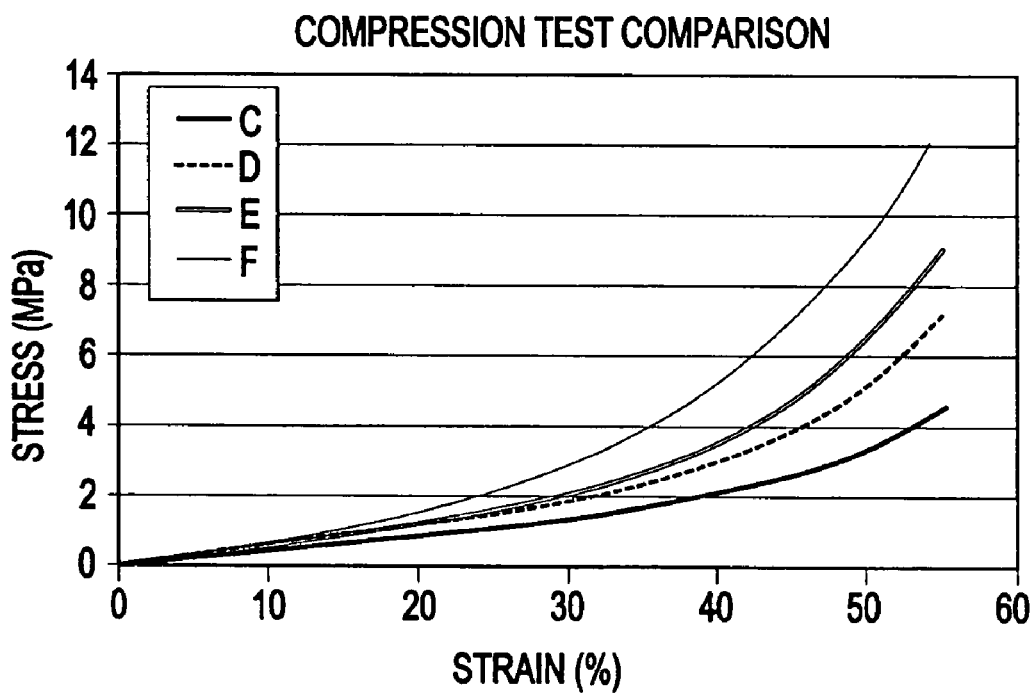
FIG. 10 shows a comparison of compression test curves for various compounds (C), (D), (E), and (F) from Table 7.

FIG. 10 shows a comparison of compression test curves for various compounds (C), (D), (E), and (F) from Table 7. It can be seen that an increase in metal fiber (BEKI-Shield GR) loading increases compressive strength of the compound, see curves for (E) and (F).

Figure 11:
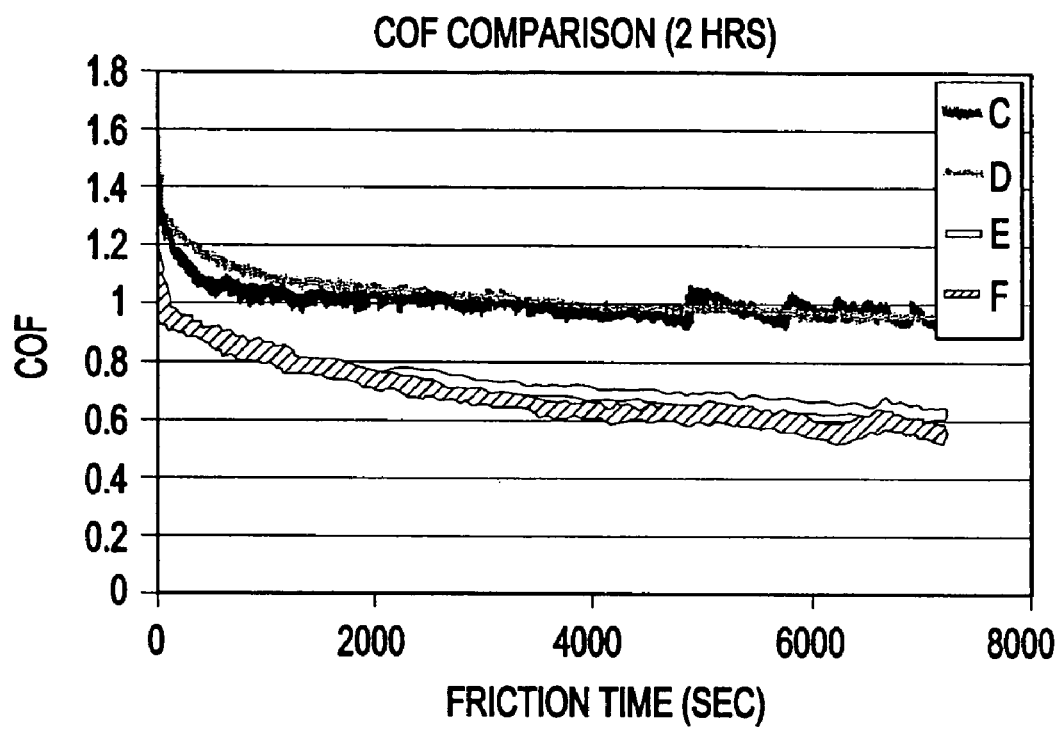
FIG. 11 shows a comparison of the coefficient of friction of the various compounds in FIG. 10.

FIG. 11 shows a comparison of the coefficient of friction of the various compounds in FIG. 10. An increase of metal fiber loading reduces the COF of the compound. Table 8 shows the recipe for each compound (E), (G), (H), (I). The difference between each compound is the use of different types of metal fibers. All are used in the amount of 50 phr (pounds per hundred rubber).

TABLE 8

Evaluation of different metal fibres.

| Ingredients | E | G | H | I |
|---|---|---|---|---|
| EPDM | 100 | 100 | 100 | 100 |
| Carbon Black | 97 | 97 | 97 | 97 |
| BEKI-Shield GR | 50 | | | |
| BEKI-Shield BU | | 50 | | |
| Bekipor WB | | | 50 | |
| MO446/10 | | | | 50 |
| ZnO | 5.00 | 5.00 | 5.00 | 5.00 |
| Stearic acid | 1.50 | 1.50 | 1.50 | 1.50 |
| PEG | 1.45 | 1.45 | 1.45 | 1.45 |
| CaO-80 | 2.00 | 2.00 | 2.00 | 2.00 |
| Sunpar 2800 | 80 | 80 | 80 | 80 |
| Saret 634 | 20 | 20 | 20 | 20 |
| Curatives | 6.40 | 6.40 | 6.40 | 6.40 |

Figure 12:
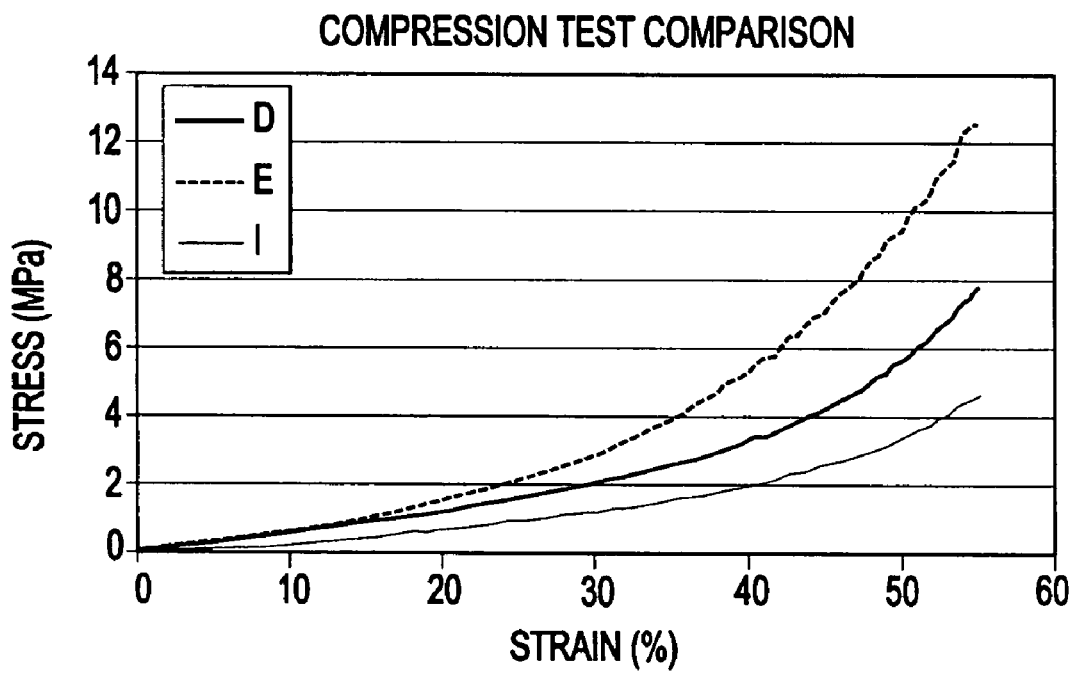
FIG. 12 shows the compressive strength of the material with the larger diameter metal fiber is lower than the control compound (D).

It was found that different forms of Bekaert metal fiber do not significantly change the improved compound physical properties, compounds (E), (G) and (H). However, the larger diameter metal fiber (MO446/10) (compound (I)) lowers some compound physical properties, for example, the compressive strength is lower than the control compound (D) (compound without metal fiber), see FIG. 12.

Figure 13:
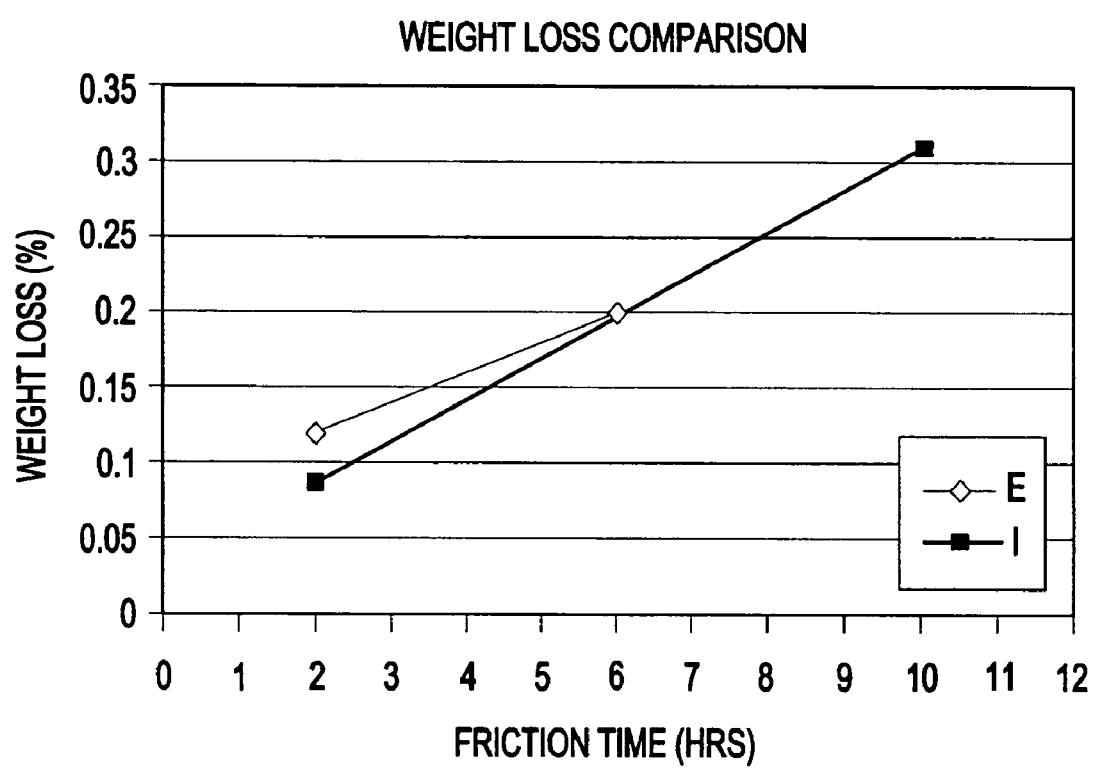
FIG. 13 shows the change of weight loss with friction time for compound (E) and (I).

FIG. 13 shows the change of weight loss with friction time for compound (E) and (I). The curve slope (weight loss per unit time) for compound (E) is lower.

The inventive compound provides higher modulus, higher compressive strength, higher tear strength and better wear property than elastomeric materials not containing metal fibers. Increasing the loading level of metal fiber (up to 100 phr) further improves these physical properties.

Hence, the inventive compound comprises a number of advantages. These include improved compressive strength, tensile strength, fatigue strength, wear resistance, electrical conductivity, magnetic properties, and heat transfer capabilities. This is manifest in part by a significantly longer wear life realized by the combination of the attributes of metals with the flexibility of elastomers.

This invention can be used for applications where the combination of strength of metals and flexibility of elastomers are required. Belt driven continuously variable transmissions (CVT) are one example. The main component of a CVT transmission is a CVT belt must be capable of handling heavy side loads applied across the width of the belt by the variable diameter pulleys. A CVT belt also has to have a very high wear resistance on the belt sides where it contacts the pulleys sheaves. The CVT belt must also transfer heat well enough to prevent thermal decomposition of the elastomer. The prior art for high load CVT belts comprises an elastomer band with metallic clips mounted transversely to the elastomer band. Manufacturing belts with transverse clips is a costly operation and the performance of such a CVT belt is limited. The heat generated by the friction between the transverse clips or belt side wall and pulley sheaves can cause thermal decomposition of the elastomer and ultimately premature failure of the belt. The inventive compound makes an improved CVT belt possible having high compressive strength and high wear resistance on the sides, as well as good heat transfer characteristics.

Another example were the inventive compound is applicable is in vehicle tires. The high wear resistant compound improves the wear resistance of the tires, i.e., tread wear rating, as well as adding other important mechanical properties such as improved tensile, compressive, and fatigue strength.

The inventive compound and products made therefrom can be used in other automotive and non-automotive applications as well including but not limited to power transmission belts, hoses, dampers, vibration isolators, and shock absorbers. Namely, the inventive compound can be used in any elastomeric or plastic application requiring high strength, higher wear resistance, electrical conductivity, magnetic properties, and improved heat transfer properties.

Although forms of the invention have been described herein, it will be obvious to those skilled in the art that variations may be made in the process and construction and relation of parts without departing from the spirit and scope of the invention described herein.

We claim:

1. A metal elastomer compound comprising:
   an elastomer having a molecular weight in the range of approximately 100,000 g/mol up to approximately 300,000 g/mol;
   a metal fiber material comprising a plurality of fibers made solely of metal each having an aspect ratio greater than approximately 1, the metal fiber material is selected from the group comprising chromium, magnesium, vanadium, titanium and combinations of two or more of the foregoing; and
   the metal fiber material mixed with the elastomer in an amount in the range of 50 phr up to 150 phr.

2. The metal elastomer compound as in claim 1 wherein the aspect ratio is in the range of 1:1 up to approximately 6000:1.

3. The metal elastomer compound as in claim 1 further comprising a bonding agent selected from the group comprising maleic anhydride grafted polyolefins, acrylic acid grafted polyolefins, zinc diacrylate, zinc dimetbacrylate, cobalt carboxylate, zirconate salt, titanate salt or a combination of two or more of the foregoing.

4. The metal elastomer compound as in claim 1 wherein the elastomer is selected from the group comprising ethylene-alpha-olefin elastomer, ethylene/acrylic elastomer, polychloroprene rubber, acrylonitrile butadiene rubber, hydrogenated acrylonitrile butadiene rubber, styrene-butadiene rubber, alkylated chlorosulfonated , epichiorohydrin, polybutadiene rubber, natural rubber, chlorinated polyethylene, brominated polymethyletyrene-butene copolymers, styrene-butadiene-styrene-block copolymer, styrene-ethylene-butadiene-styrene-block copolymer, acrylic rubber, ethylene vinyl acetate elastomer, silicone rubber and a combination of any two of the foregoing.

5. The metal elastomer compound as in claim 1 further comprising:
   a metal powder material mixed with the elastomer material, wherein the metal powder material is selected from the group comprising stainless steel, steel having a carbon content of up to 1.0%, alloy steels, aluminum, aluminum alloys, copper, brass and bronze, nickel, chromium, zinc, tin, magnesium, vanadium, titanium and inconel and combinations of two or more of the foregoing; and
   the metal powder material having an aspect ratio of approximately 1.

6. The metal elastomer compound as in claim 5 wherein the ratio by weight of metal powder material to metal fiber material is in the range of zero to approximately one.

7. The metal elastomer compound as in claim 1, wherein a substantial number of the metal fibers are substantially parallel to each other.

8. The metal elastomer compound as in claim 6, wherein a substantial number of the metal fibers are substantially parallel to each other.

9. The metal elastomer compound as in claim 1, wherein the fibers made solely of metal are each coated with polyester resin.

10. The metal elastomer compound as in claim 1, wherein tile elastomer comprises EPDM.

11. The metal elastomer compound as in claim 1 further comprising stainless steel, steel having a carbon content of up to 1.0%, alloy steels, aluminum, aluminum alloys, copper, brass and bronze, nickel, zinc, tin, inconel or two or more of the foregoing.

* * * * *

UNITED STATES PATENT AND TRADEMARK OFFICE
CERTIFICATE OF CORRECTION

PATENT NO. : 7,598,308 B2
APPLICATION NO. : 11/094009
DATED : October 6, 2009
INVENTOR(S) : Yahya Hodjat and Yuding Feng It is certified that error appears in the above-identified patent and that said Letters Patent is hereby corrected as shown below:

Column 9, line 30, "dimetbacrylate" should be corrected to -- dimethacrylate --
Column 9, line 38, after "chlorosulfonated", insert -- polyethylene --
Column 9, line 38, "epichiorohydrin" should be corrected to -- epichlorohydrin --
Column 10, line 32, delete "tile", insert -- the --

Signed and Sealed this

Eighth Day of December, 2009

David J. Kappos
*Director of the United States Patent and Trademark Office*